United States Patent
Hatfield

[19]

[11] Patent Number: 5,878,697
[45] Date of Patent: Mar. 9, 1999

[54] ANIMAL SAFETY STANCHION

[76] Inventor: John Hatfield, 1823 Shoestring Rd., Gooding, Id. 83330

[21] Appl. No.: 857,387

[22] Filed: May 15, 1997

[51] Int. Cl.⁶ .............................. A01K 1/06; A01K 1/08
[52] U.S. Cl. ............................................ 119/741; 119/739
[58] Field of Search ...................... 119/739, 740, 119/741, 742

[56] References Cited

U.S. PATENT DOCUMENTS

| | | | |
|---|---|---|---|
| Re. 32,728 | 8/1988 | Albers, Sr. | 119/750 |
| Re. 34,232 | 4/1993 | Da Silveira | 119/740 |
| 4,037,566 | 7/1977 | Albers | 119/741 |
| 4,051,813 | 10/1977 | Albers | 119/741 |
| 4,055,149 | 10/1977 | Haiges | 119/740 |
| 4,185,592 | 1/1980 | Albers, Sr. | 119/741 |
| 4,377,131 | 3/1983 | Vandenberg et al. | 119/740 |
| 4,457,265 | 7/1984 | Anderson | 119/750 |
| 4,476,815 | 10/1984 | Albers, Sr. | 119/750 |
| 4,495,897 | 1/1985 | Albers, Sr. | 119/750 |
| 4,867,105 | 9/1989 | Hatfield | 119/740 |
| 4,930,452 | 6/1990 | Da Silveira | 119/740 |
| 5,226,387 | 7/1993 | Anderson | 119/742 |
| 5,289,798 | 3/1994 | Lock | 119/58 |
| 5,309,869 | 5/1994 | Albers, Jr. | 119/735 |
| 5,373,813 | 12/1994 | Da Silveira | 119/740 |
| 5,564,368 | 10/1996 | Hepp et al. | 119/740 |

FOREIGN PATENT DOCUMENTS

| | | |
|---|---|---|
| 2 242 929 | 5/1975 | France . |
| 2 332 703 | 7/1977 | France . |
| 24 46 026 | 4/1976 | Germany . |
| 26 32 057 | 1/1978 | Germany . |
| 28 18 513 | 11/1979 | Germany . |
| 29 11 431 | 9/1980 | Germany . |
| 646960 | 2/1979 | Russian Federation . |

Primary Examiner—Michael J. Carone
Assistant Examiner—Elizabeth Shaw
Attorney, Agent, or Firm—Frank J. Dykas

[57] ABSTRACT

An animal stanchion having fixed stanchion structure and a pivotal release stanchion laterally spaced apart to define a head opening and a latching mechanism which includes a first latch coupler attached to the fixed stanchion structure for receiving and releasably holding a second latch coupler and a control rod mounted adjacent to the first latch coupler for rotatable positioning to a first position to make contact with the second latch coupler at any point along the control rod's longitudinal axis to release it and to rotate to a second position to permit engagement of the second latch coupler with the first latch coupler.

15 Claims, 7 Drawing Sheets

ANIMAL SAFETY STANCHION

BACKGROUND OF THE INVENTION

1. Technical Field

This invention relates to animal stanchions, and more particularly to automatic locking cattle stanchions having opened, closed and downed animal positions.

2. Background

Safety stanchions to hold, and selectively release cows during feeding, milking, veterinary care, pregnancy testing and even calving, are very commonly used throughout the United States. They are found in feed lots, ranching operations, dairies and virtually any other activity where cattle and dairy cows are tended to. They have some common characteristics, in that they are usually fabricated in long strings of individual stanchions connected between top and bottom rails and set in concrete which are used to separate the animals from the feed bunker.

In the typical prior art cattle stanchion being manufactured today, the head opening for the animal is typically defined between a stationary, vertically-oriented stanchion, and a pivotal release stanchion, which when tilted in one direction enlarges the upper part of the opening so that the animal can put its head through. As the animal lowers its head to reach the feed, the pivotal release stanchion pivots to a more vertical position, where it automatically latches in place to define the closed position. In the closed position the animal cannot withdraw its head from the stanchion and is effectively held in place. If the animal becomes distressed and falls down, or is knocked down by an adjacent animal, the stanchion can be individually released to a downed cow position by releasing the latch on the release stanchion and allowing it to pivot in the opposite direction to enlarge the opening in the lower portion of the head opening so that the downed animal can remove its head.

These long strings of cattle stanchions serve many useful functions which include, but are not limited to, permitting each animal equal access to the feed bunker for equal portion sizing, for holding the animals close together where they are most comfortable since they are instinctually herd animals, and to immobilize the animal for veterinary care, such as dehorning, vaccinating, pregnancy testing and a host of other types of uses.

Control of the latch mechanism for the release stanchion in the prior art has traditionally been accomplished by means of a control rod, which is mounted atop the top rail. In the prior art the control rod contains one of two cooperating parts of a latch mechanism for the release stanchion, with the other cooperating part of the latch mechanism attached to the top of the pivotal release stanchion. The typical prior art safety stanchion assembly contains a control rod which provides for the following lock and release functions: a locked open position where the release stanchion automatically falls to the open position where the upper portion of the opening is enlarged to enable an animal to insert its head and then lower its head, swinging the release stanchion out of the way as it reaches for feed; an open to automatic closed position where when the animal lowers its head the release stanchion locks in place in the closed position to automatically lock the animal in the stanchion; a manually operable downed cow position wherein the rancher or dairyman can release an individual animal that has fallen down by manually pivoting the release stanchion to the downed cow position; and a locked closed position to lock all of the stanchions in a closed position to either keep the animals from inserting their heads through the stanchions, or to keep all of the animals contained within the stanchions.

Considerable effort has been expended in the prior art to build safe to operate and effective latching mechanisms. The reason for this is the safety issue, since large animals can exert considerable and sudden forces to the pivotal release stanchions, especially when startled or distressed.

The problem in the prior art comes not from the effectiveness of the prior art latching mechanisms, although some latching mechanisms work much better than others, but rather from the fundamental design which requires one cooperating part of the latch mechanism is attached to the pivotal release stanchion, and the other is attached to the control rod which is mounted above the top rail. Since they must be stoutly built to restrain the animals, strings of cattle stanchions are fabricated of metal, usually steel and metal, including steel, expands and contracts with changes in temperature. Since these continuous strings of cattle stanchions can literally include hundreds of stanchions, all in one continuous row, the amount of expansion and contraction can be considerable.

In the prior art, the fixed vertical stanchions are usually anchored in concrete and firmly attached to the upper and lower rails. In a like manner, the pivotal release stanchion is also attached to a pivot support bar of some sort, which itself is attached to the upper and lower rails, thereby locking this portion of the assembly firmly together. At the same time, the control arm, which may be fabricated of a different metal alloy, is usually mounted to be both rotatable and slideable. It is normally of a different dimension than the top rail. Thus, even though it is mounted above the top rail, it is free to expand and contract differently than the rigid support structure to which it is mounted.

In the prior art, if you have a string of stanchions of any significant number, it is quite common that all of the couplers on the slideable and rotatable control arm will align with the matching latch couplers on the pivotal release stanchions in the morning when the entire assembly is cold, and in the warm summer afternoon, have enough expansion of the control arm, such that the control arm coupler mechanisms will line up with the pivotal release stanchion couplers at one end of the string, but not at the other.

As a result, in the prior art, considerable expense and effort is made to provide control arm length adjustment features so as to keep all of the control arm couplers aligned with the mating couplers of the pivotal release stanchions across the entire length of the string of stanchions. It is not uncommon for the rancher or dairyman to have to readjust the control arm lengths with each change of season, and in some areas of the country where there are significant temperature differentials between cold nights and warm days, to have to readjust the control arms on a daily basis.

Accordingly, it is an object of the present invention to eliminate the need to adjust the length of the control arm to continually realign the cooperating coupler portions of the latching mechanism so that adjustments for variations in length due to expansion and contraction of the stanchion materials is eliminated.

Another object of the present invention is to provide a latching mechanism which is simple, effective and safe for the operator.

DISCLOSURE OF INVENTION

These objects are achieved by the development of an animal stanchion which is formed of a generally vertically oriented fixed stanchion and a pivotal release stanchion which is attached to a fulcrum rail and a fulcrum strut for pivotal support. Each fixed stanchion and fulcrum rail and fulcrum strut are all interconnected between a fixed top rail and a fixed bottom rail to form a rigid structure.

At the top of the release stanchion there is found a release stanchion bracket which is attached to the release stanchion and configured to overfit the top rail.

Attached to the top rail is a latch block configured to have a latch finger receiving recess.

Mounted above the top rail by means of slide rail brackets is a control rod which is capable of being both rotated and slid along its longitudinal axis.

The control rod is configured in size and shape such that it has first and second cross-sectional width radially displaced from each other. It is mounted adjacent to the latch block in a position to make contact with, and to move latch fingers out of engagement with the latch block when rotated to put the first cross-sectional width in juxtaposed relationship with the latch block, and to permit engagement of the latch fingers with the latch block when the control rod is rotated to put its second cross-sectional width into juxtaposed relationship with the latch block. This is accomplished irrespective of the longitudinal position of the control rod relative to the latch fingers, since there is no latch assembly which requires interfitting cooperation between the latch block, or latch fingers, and the control rod. Since the latch blocks are firmly held in fixed relationship to the corresponding pivot point of the release stanchion, the relative positional relationship between the latch block and the latch fingers is fixed irrespective of the relative longitudinal position of the control rod, or whether or not the string of animal stanchions has undergone significant expansion or contraction as a result of temperature changes.

The release stanchions are configured to fall into an open position when released. A means is also provided for manually locking all of the release stanchions in the string of animal stanchions simultaneously. This is accomplished by the positioning of a manual lock out bolt on the second cross-sectional dimension which, in the preferred embodiment, is a flat surface. The manual lock out bolt is configured to engage with one of the latch fingers and to force the latch fingers to ride over the top of the latch block and drop into the recess, thereby pushing the release stanchion into a closed and locked position.

Each animal stanchion is configured to define a head opening for an animal between the fixed stanchion and the release stanchion, and for pivotal movement of the release stanchion between an open position in which the upper part of the head opening is enlarged to enable an animal to place its head through the opening, and then to a closed position in which the upper part is narrowed to hold the animal's head in the opening, and beyond the closed position to a downed animal position in which the lower part of the head opening is enlarged for an animal to remove its head through the opening in the lower part.

BEST MODE FOR CARRYING OUT INVENTION

Figure 3:
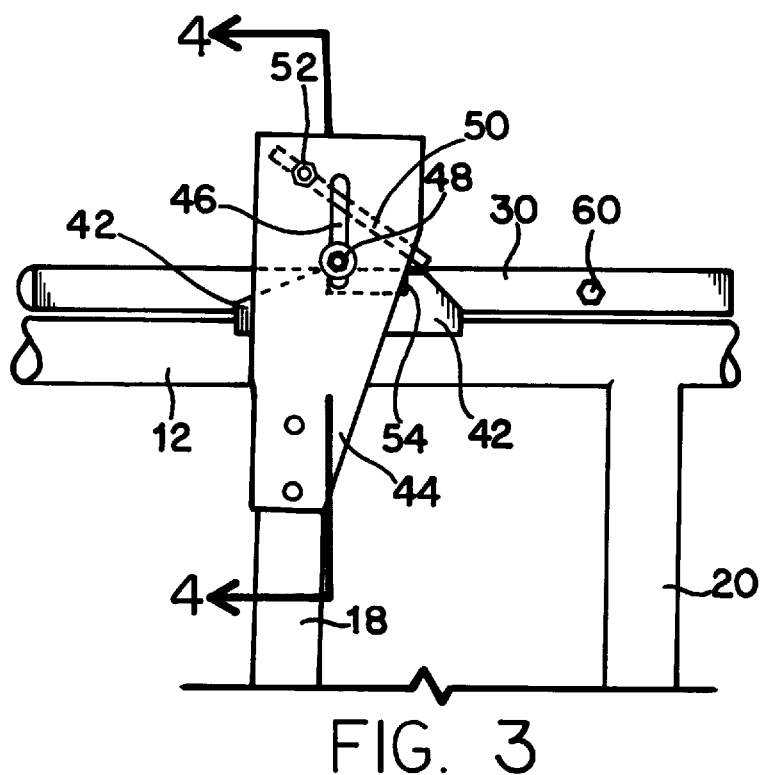
FIG. 3 is a sectional side view of the animal stanchion showing the release stanchion in a released position.
Figure 4:
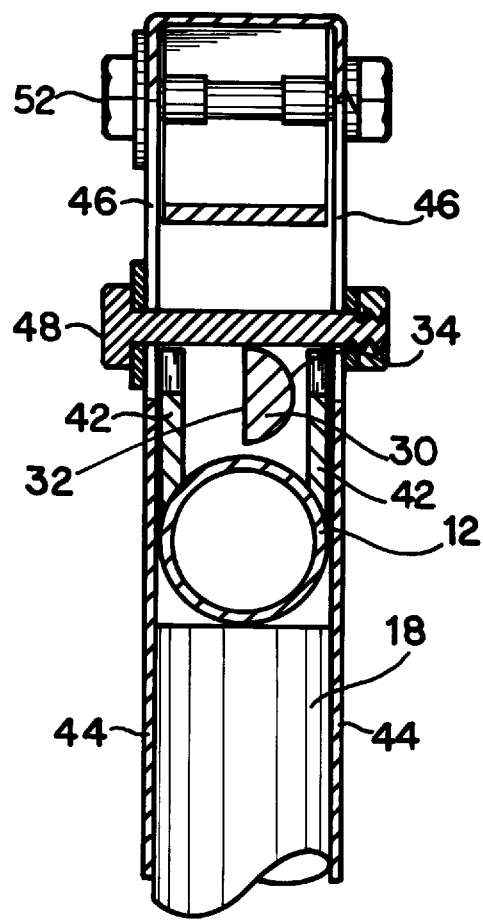
FIG. 4 is a section view of the latch assembly in the released position of FIG. 4 taken along plane 4—4.
Figure 5:
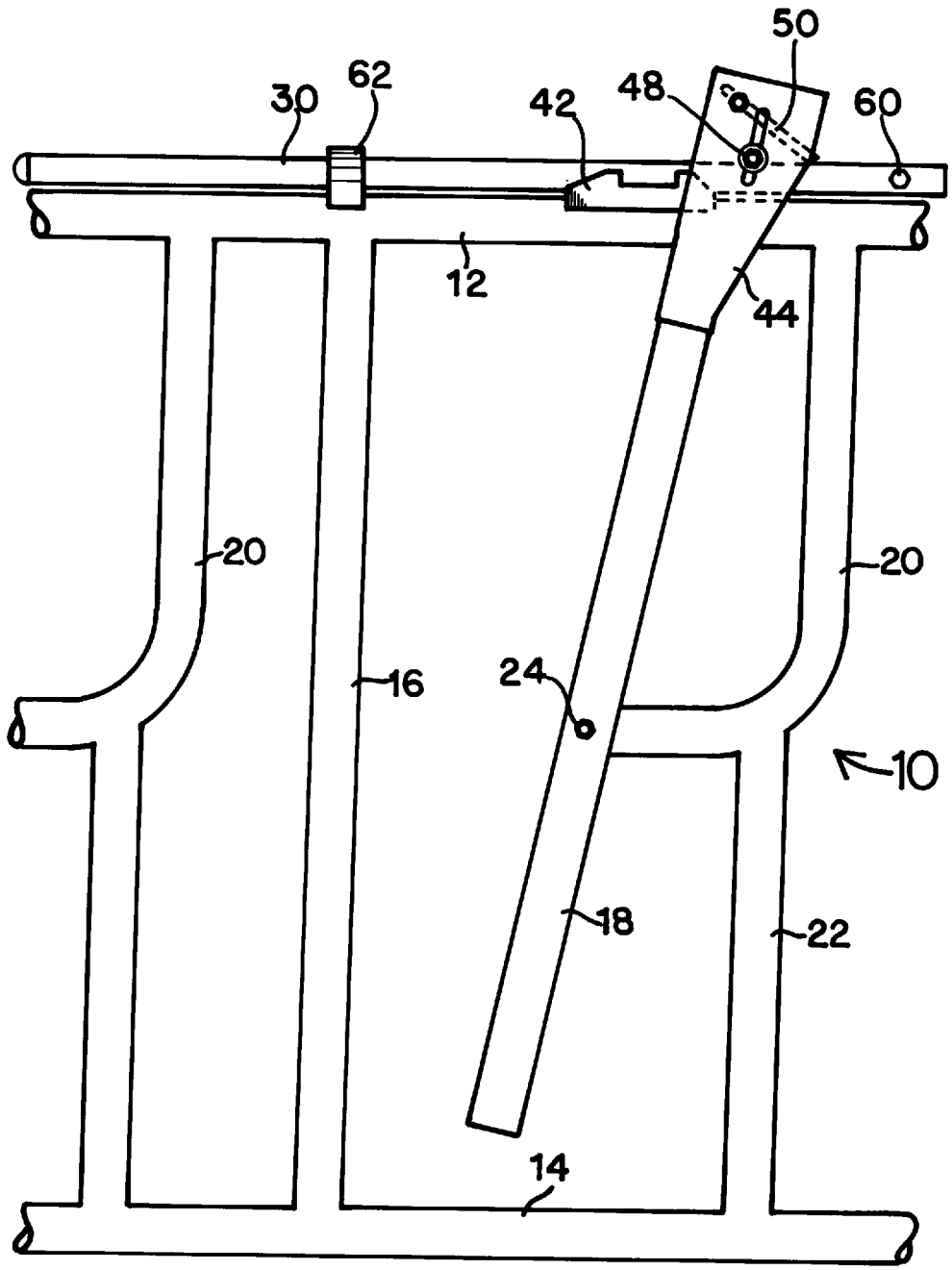
FIG. 5 is a side view of the animal stanchion with the release stanchion in the open position.
Figure 6:
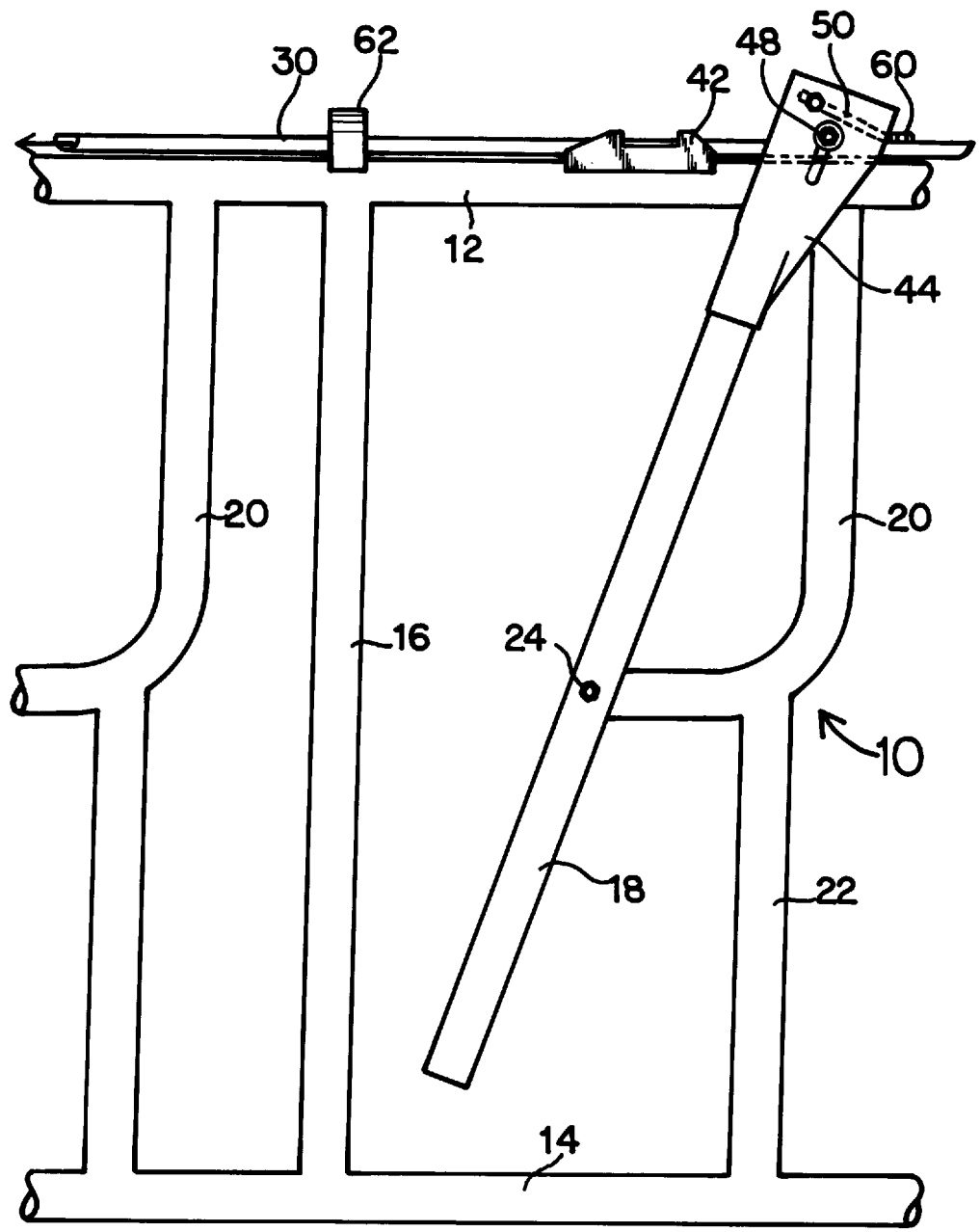
FIG. 6 is a side view of the animal stanchion being manually engaged for repositioning to the closed position.
Figure 7:
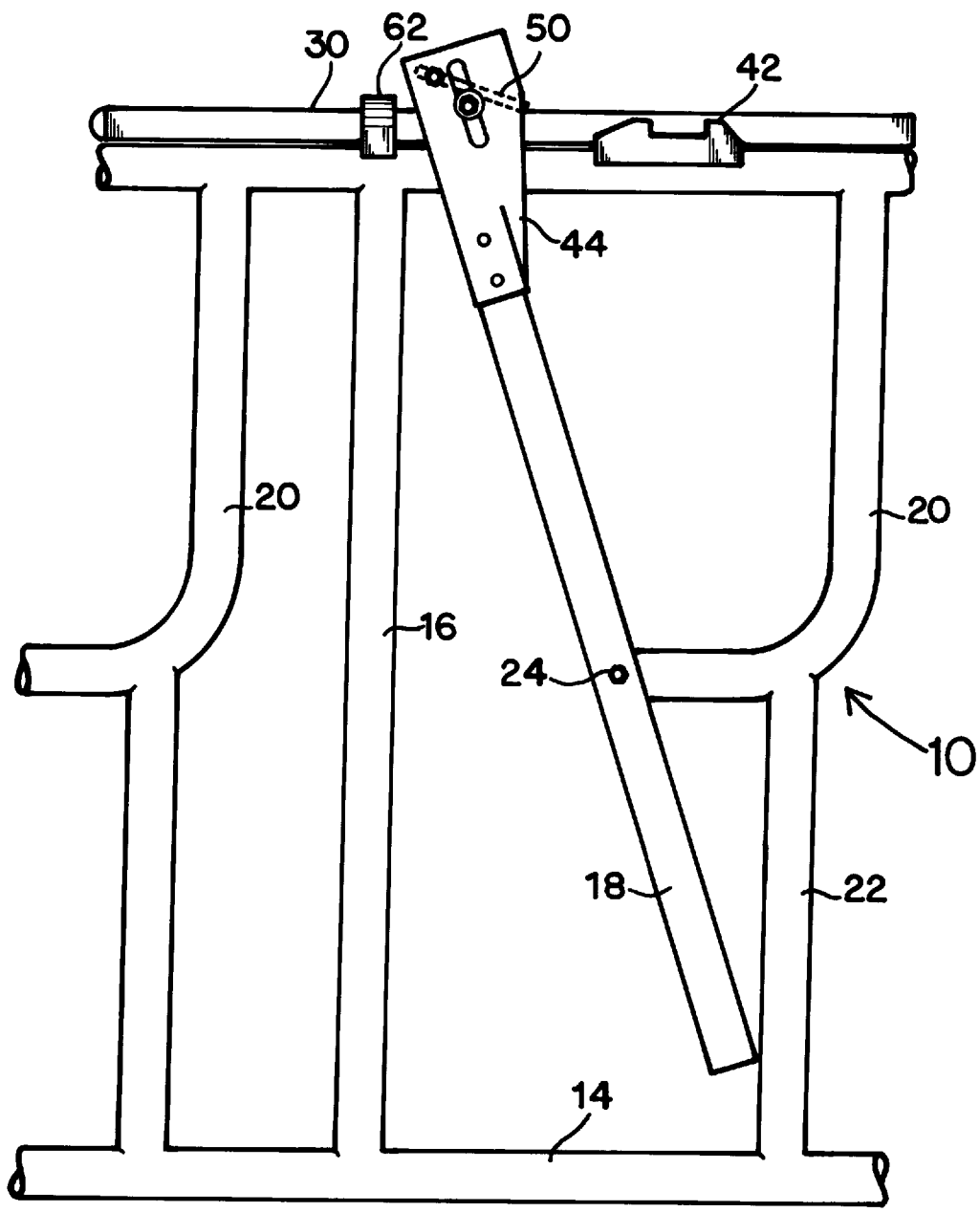
FIG. 7 is a side view of the animal stanchion with the release stanchion in the downed animal position.

There is shown in FIGS. 1 through 7, a first preferred embodiment of the animal stanchion 10. There is shown in FIGS. 5, 6 and 7 a side view of animal stanchion 10, as one animal stanchion amongst an assembly of a string of identical animal stanchions. Each animal stanchion is formed of generally vertically oriented fixed stanchion 16, pivotal release stanchion 18, fulcrum rail 20, and fulcrum strut 22, which pivotally support release stanchion 18 by means of pivot pin 24. Fixed stanchion 16, fulcrum rail 20 and fulcrum strut 22 are all interconnected between fixed top rail 12 and fixed bottom rail 14.

At the top end of release stanchion 18 there is found a release stanchion bracket 44, which is attached to release stanchion 18 and configured to over fit top rail 12. Attached to top rail 12 is latch block 42, which in the preferred embodiment is a pair of plates firmly attached to top rail 12, with each plate configured to have a matching latch finger recesses 54.

Mounted above top rail 12 by means of slide rail bracket 62 is control rod 30. Control rod 30 interfits between the two latch block plates 42. In the preferred embodiment, control rod 30 is semi-circular, having a curved surface 34 and flat surface 32. In this configuration, control rod 30 in effect has two cross sectional lengths, the first one being equal to what would be the diameter of control rod 30 if control rod 30 was circular, and a second cross-sectional length from the flat surface to the curved surface which would be equal to the radius which is, of course, one half of the diameter. Control rod 30 is rotatably mounted above top rail 12 by means of slide rail bracket 62 and also capable of being slid back and forth along its longitudinal axis. Control rod 30 is configured in size such that when it is flat side up, flat surface 32 is at the same elevational height, or slightly below, the elevational height of recess 54 in latch block 42 and, when rotated ninety degrees (90°) in either direction, such that the longer dimension, namely the diameter, is parallel to latch block plates 42, the top surface of control 30 is slightly above latch blocks 42 such that the latch fingers, as later described, will ride above and out of recess 54 of latch block plate 42.

Figure 1:
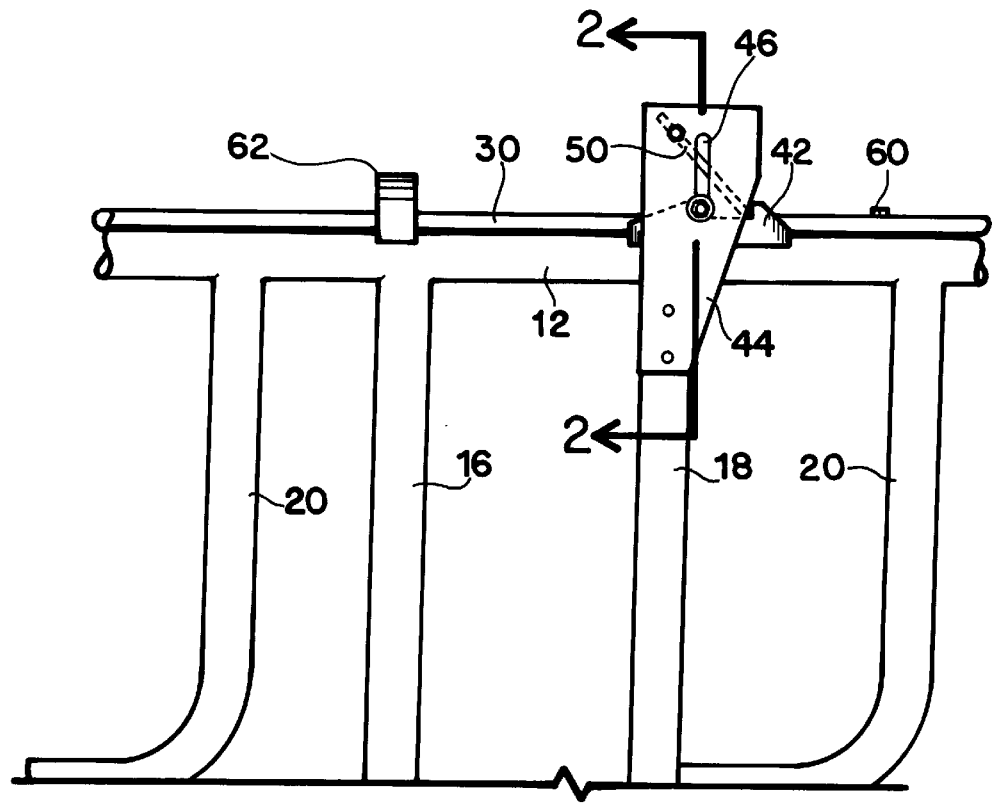
FIG. 1 is a sectional side view of the animal stanchion showing the release stanchion in a locked position.
Figure 2:
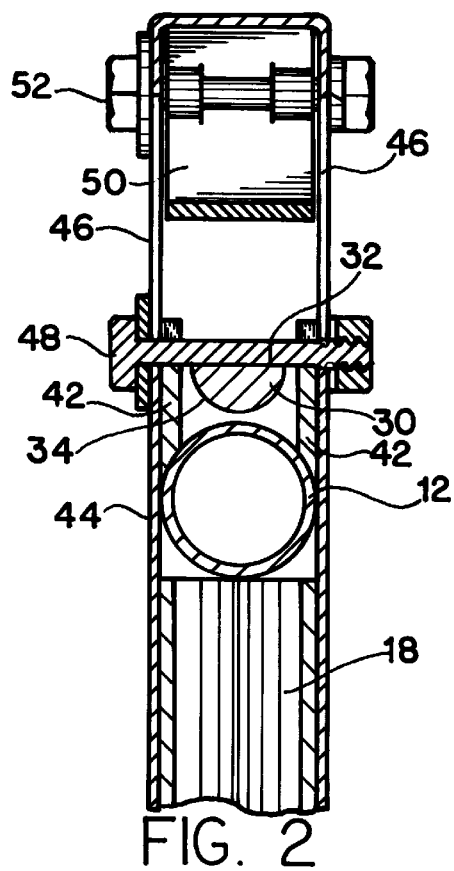
FIG. 2 is a sectional view of the latch assembly in the locked position of FIG. 1 taken along plane 2—2.

Referring to FIGS. 1 and 2, there is shown the configuration of animal stanchion 10 and release stanchion 18 is locked in the closed position. As can be seen, control rod 30 has been rotated such that flat surface 32 is up, and thus control rod 30 presents, in parallel juxtaposed position its first, shorter dimension to latch blocks 42, thus permitting a first latch finger, namely latch plate 50 which is hinged to latch plate to release stanchion bracket 44 by means of hinge pin 52, to rest within recess 54. In addition, a second latch finger, which in this preferred embodiment is latch bolt 48, will also rest within recess 54.

When control rod 30 is rotated 90° to present its second and greater cross-sectional length to latch blocks 42, as is shown in FIGS. 3 and 4, first and second latch fingers, namely latch plate 50 and latch bolt 48 are elevated above the recess 54 and latch blocks 42, thus enabling release stanchion 18 to be moved in either direction. This is facilitated by slot 46 in which latch bolt 48 is slidably held within bracket 44, and thus the release stanchion can be pivoted one direction to another.

In the preferred embodiment, release stanchion 18 is configured to fall to the open position, as is shown in FIG. 5. Thus, by rotating control rod 30 to present its longer cross-sectional length in parallel relationship to latch blocks 42, the release stanchions of a string of animal stanchions will all fall to the open position. This is accomplished irrespective of the longitudinal position of control rod 30, since there is no latch assembly which requires interfitting cooperation with latch block 42 or latch fingers found on control rod 30. And, since latch blocks 42 are firmly held in fixed relationship to the corresponding pivot point 24 of release stanchion 18, the relative positional relationship between latch box 42 and the latch fingers 48 and 50 is fixed irrespective of whether or not the string of animal stanchions has undergone significant expansion or contraction as a result of temperature changes. It should be apparent that by use of control rod 30 in the configuration of the preferred embodiment, whether or not it expands or contracts at a different rate from that of top rail 12 and the rest of the fixed structure is irrelevant to proper alignment between latch blocks 42 and the latching fingers.

Since the release stanchions 18 are configured to fall to the open position when released, a means is also provided for manually locking all of the release stanchions in the string of animal stanchions simultaneously. This is accomplished by the positioning of manual lock-out bolt 60 on the flat surface 32 of control rod 30. In this configuration, control rod 30 is rotated to present its flat side 32 up, and its shortest cross-sectional length parallel to latch blocks 42 to enable latch bolt 48 and latch finger 50 to ride over the top of latch blocks 42 and drop into recess 54 when the control rod is pulled or pushed, in the direction of the arrow shown in FIG. 6 to cause manual lock up bolts 60 to engage against latch plate 50 and thereby push release stanchion 18 into the closed and locked position.

FIG. 7 shows the release stanchion pivoted to the downed cow position, wherein the lower portion of the opening for the animal's head is enlarged to enable an animal that has fallen or has been knocked down to withdraw its head from the stanchion. It also discloses another feature of the first preferred embodiment, namely that use of latch bolt 48 and within slots 46 of bracket 44 is able to engage against latch plate 50 and thereby enable both latch bolt 48 and latch plate 50 to be manually elevated by an operator to release release stanchion 18 from latch block 42. This can also be accomplished without the operator sticking his or her fingers between the plates of bracket 44, since latch bolt 48 is accessible from the outside of brackets 44. In practice this has been found to be a significant safety feature, which reduces the risk of injury to operators.

Figure 8:
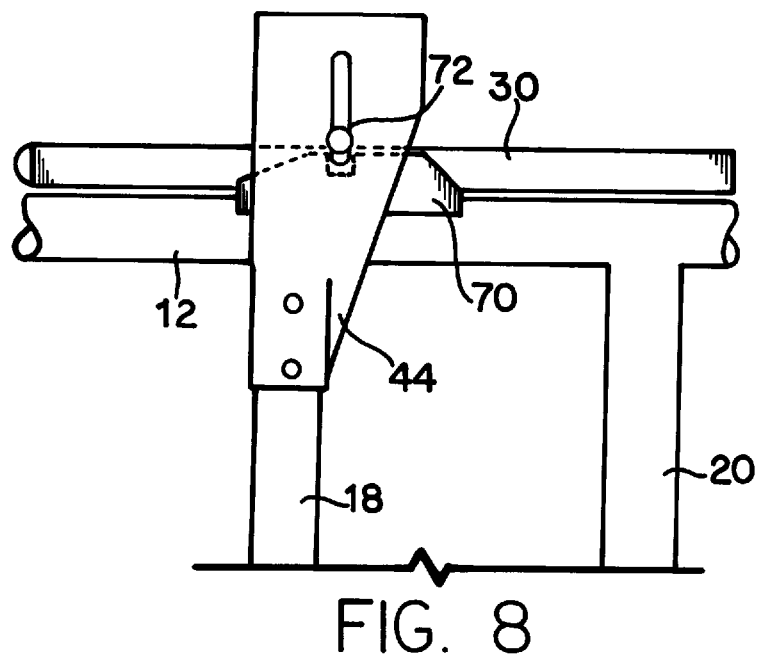
FIG. 8 is a sectional side view of a second embodiment of the latch assembly.

FIG. 8 discloses a second embodiment, which is simpler than the first embodiment in that it provides for only one latch bolt 72. Since the problems of varying rates of expansion and contraction have been solved by the use of control rod 30, a single latch bolt 72 will work in cooperation with latch block 70. However, although it will work, in practice it doesn't work as well as the first preferred embodiment, since when the animal inserts its head into the opening and subsequently lowers it to reach the feed, the pivoting action of release stanchion 18 can be quite forceful and fast, to the extent that it can override the latch bolt 72 into the downed cow position, and then when the animal raises its head again, can slam back to the open position. Use of two latch fingers reduces the risk of failure for the latches to engage on the back swing from an unlatched downed cow position to the closed position as the animal raises its head again.

Figure 9:
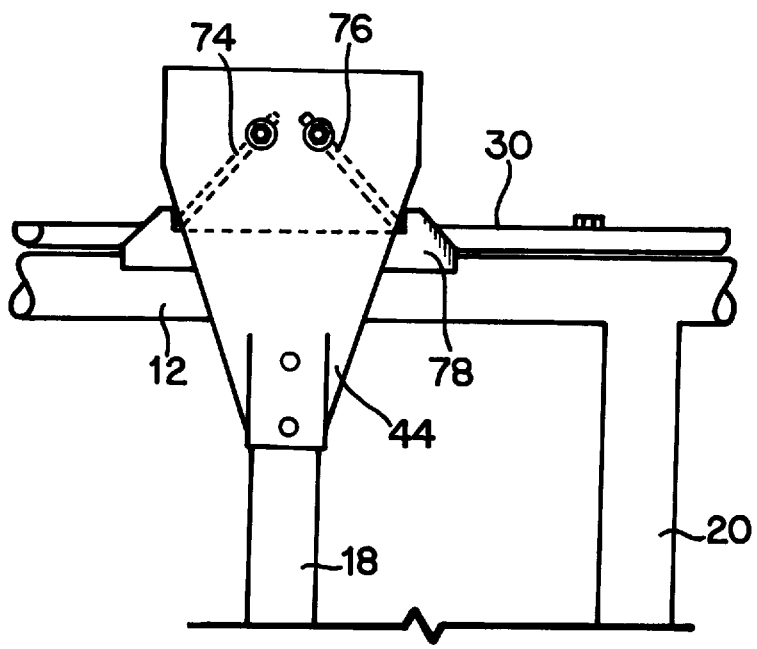
FIG. 9 is a sectional side view of a third embodiment of the latch assembly.

While the first preferred embodiment provides for a latch bolt 46 and latch plate 50, there is a third embodiment of the latching assembly shown in FIG. 9. In this embodiment, latch plate 74 is substituted for latch bolt 48, and the requirement for slots 46 are eliminated. Latch plate 76 is substituted for latch plate 50, as previously described in the first embodiment, and functions in the same manner, with both latch plates 74 and 76 interfitting within latch block plates 78 in the same manner as latch block plates 42 of the first embodiment. This embodiment will also work well. However, it does not provide for the safety features of access and release of both latch plate 50 and latch bolt 46 from the outside of bracket 44.

While there is shown and described the present preferred embodiment of the invention, it is to be distinctly understood that this invention is not limited thereto but may be variously embodied to practice within the scope of the following claims.

I claim:

1. In an animal stanchion including fixed and release stanchions laterally spaced apart to define a head opening for an animal, said fixed structure including mounting means mounting said release stanchion for pivotal movement between an open position in which the upper part of said head opening is enlarged to enable an animal to place its head through said opening, to a closed position in which said upper part of said opening is narrowed to hold the animal's head in said opening, and beyond said closed position to a downed animal position in which the lower part of said head opening is enlarged to enable an animal to remove its head through the opening in the lower part, said release stanchion being supported and arranged to fall into said open position when released from a latching mechanism, a latching mechanism which comprises:

a first latch coupler attached to said fixed structure mounting means for receiving and releaseably and simultaneously holding a cooperating second latch coupler;

a second latch coupler for cooperating engagement with the first latch coupler moveably mounted to the release stanchion for selectable engagement with said first latch coupler, and configured to prevent, when engaged with the first latch coupler, pivotal movement of the release stanchion;

a control rod having a longitudinal axis mounted adjacent to the first latch coupler for positioning to a first position to make contact with, at any point along said control rod's longitudinal axis, and to move, said second latch coupler out of engagement with said first latch coupler, and to a second position to permit engagement of second latch coupler with said first latch coupler; and means for manually disengaging said second latch coupler from engagement with said first latch coupler to permit pivotal movement of the release stanchion.

2. In an animal stanchion including fixed and release stanchions laterally spaced apart to define a head opening for an animal, fixed structure including mounting means mounting said release stanchion for pivotal movement between an open position in which the upper part of said head opening is enlarged to enable an animal to place its head through said opening, to a closed position in which said upper part of said opening is narrowed to hold the animal's head in said opening, and beyond said closed position to a downed animal position in which the lower part of said head opening is enlarged to enable an animal to remove its head through the opening in the lower part, said release stanchion being supported and arranged to fall into said open position when released from a latching mechanism, a latching mechanism which comprises:

a latch block attached to said fixed structure mounting means for receiving and releasably and simultaneously holding first and second latch fingers;

a first latch finger for engagement within the latch block moveably mounted to the release stanchion for selectable engagement with said latch block, and configured to prevent, when engaged with the latch block, pivotal movement of the release stanchion from the closed position to the open position;

a second latch finger for engagement within the latch block moveably mounted to the release stanchion for selectable engagement with said latch block, and configured to prevent, when engaged with the latch block, pivotal movement of the release stanchion from the closed position to the downed animal position;

a control rod having a longitudinal axis and a cross-sectional shape configured to provide first and second cross-sectional widths radially displaced from each other rotatably mounted adjacent to the latch block in a position to make contact with, and to move, said first and second latch fingers out of engagement with said latch block when rotated to put the first cross-sectional width of said control rod in juxtaposed relationship with the latch block, and to permit engagement of said first and second latch fingers with said latch block when said control rod is rotated to put said second cross-sectional width into juxtaposed relationship with said latch block;

means for manually disengaging said first latch finger from engagement with said latch block to permit pivotal movement of the release stanchion from the closed position to the open position; and means for manually disengaging said second latch finger from engagement with said latch block to permit pivotal movement of the release stanchion from the closed position to the downed animal position.

3. The animal stanchion of claim 2 which further comprises:

said mounting means being configured to permit the release stanchion to pivotally fall into the open position when the first latch finger is disengaged from the latch block.

4. The animal stanchion of claim 2 which further comprises:

the control rod being slideably and rotatably mounted adjacent to the latch block;

means for engaging and pushing against the first latch finger attached to the control rod and configured to engage against said first latch finger when the control rod is rotated into the position wherein the second cross-sectional width is in juxtaposed relationship with the latch block; and means for sliding the control rod to engage the means for engaging the first latch finger against said first latch finger so as to rotate the release stanchion from the open position to the closed position.

5. The animal stanchion of claim 4 which further comprises:

said mounting means being configured to permit the release stanchion to pivotally fall into the open position when the first latch finger is disengaged from the latch block.

6. In an animal stanchion which comprises:

a vertically oriented fixed stanchion;

a release stanchion laterally spaced apart from the fixed stanchion to define a head opening for an animal having upper and lower parts;

mounting means mounting said release stanchion for pivotal movement between an open position in which the upper part of said head opening is enlarged to enable an animal to place its head through said opening, to a closed position in which said upper part of said opening is narrowed to hold the animal's head in said opening, and beyond said closed position to a downed animal position in which the lower part of said head opening is enlarged to enable an animal to remove its head through the opening in the lower part, said release stanchion being supported and arranged to fall into said open position when released from a latching mechanism;

a latch block attached to said mounting means for releasably receiving and simultaneously engaging first and second latch fingers;

a latch finger assembly having a first latch finger for engagement within the latch block moveably mounted to the release stanchion for selectable engagement with said latch block, and configured to prevent, when engaged with the latch block, pivotal movement of the release stanchion from the closed position to the open position and a second latch finger for engagement within the latch block moveably mounted to the release stanchion for selectable engagement with said latch block, and configured to prevent, when engaged with the latch block, pivotal movement of the release stanchion from the closed position to the downed animal position;

a control rod having a longitudinal axis and a cross-sectional shape configured to provide first and second cross-sectional widths radially displaced from each other, rotatably mounted adjacent to the latch block in a first position to make contact with, and to move, said first and second latch fingers out of engagement with said latch block when rotated to put the first cross-sectional width of said control rod in juxtaposed relationship with the latch block, and to permit engagement of said first and second latch fingers with said latch block when said control rod is rotated to a second position to put said second cross-sectional width into juxtaposed relationship with said latch block;

means for manually disengaging said first latch finger from engagement with said latch block to permit pivotal movement of the release stanchion from the closed position to the open position; and means for manually disengaging said second latch finger from engagement with said latch block to permit pivotal movement of the release stanchion from the closed position to the downed animal position.

7. The animal stanchion of claim 6 which further comprises:

said mounting means being configured to permit the release stanchion to pivotally fall into the open position when the first latch finger is disengaged from the latch block.

8. The animal stanchion of claim 6 which further comprises:

the control rod being slideably and rotatably mounted adjacent to the latch block;

means for engaging and pushing against the first latch finger attached to the control rod and configured to engage against said first latch finger when the control rod is rotated into the position wherein the second cross-sectional width is in juxtaposed relationship with the latch block; and means for sliding the control rod to engage the means for engaging the first latch finger against said first latch finger so as to rotate the release stanchion from the open position to the closed position.

9. The animal stanchion of claim 8 which further comprises:

said mounting means being configured to permit the release stanchion to pivotally fall into the open position when the first latch finger is disengaged from the latch block.

10. The animal stanchion of claim 6 wherein said mounting means further comprises:

a vertically oriented fixed pivot support stanchion in laterally juxtaposed relationship with the fixed stanchion;

means for pivotally the release stanchion to the pivot support stanchion;

a horizontally oriented top rail fixedly interconnecting the upper ends of the fixed stanchion and the pivot support stanchion; and means for attaching the latch block to the top rail.

11. The animal stanchion of claim 10 wherein said control rod mounting means further comprises rotatably and slidably mounted said control rod to the top rail.

12. The latch finger assembly of claim 11 which further comprises:

a bracket attached to the upper end of the release stanchion, said bracket having a pair of opposing slots for slideably retaining a latch bolt and configured for positioning a latch bolt in a lowered position where it will engage the latch block, and in a raised position where it will disengage from the latch block;

a latch bolt extending through, and slideably retained within the opposing slots in the bracket and configured to slideably rest atop the control rod when it is rotated to its first position, and for engagement with the latch block when the control rod is rotated to its second position, and for manual raising along the slot; and a latch tang pivotally mounted within the bracket and configured to slideably rest atop the control rod when it is rotated to its first position, and for engagement with the latch block when the control rod is rotated to its second position, and for manual raising by engagement with the latch bolt when it is manually raised within the slot.

13. The latch finger assembly of claim 12 which further comprises configuring the latch bolt to be accessible to for manual sliding from the outside of the bracket.

14. The latch finger assembly of claim 6 which further comprises:

a bracket attached to the upper end of the release stanchion, said bracket having a pair of opposing slots for slideably retaining a latch bolt and configured for positioning a latch bolt in a lowered position where it will engage the latch block, and in a raised position where it will disengage from the latch block;

a latch bolt extending through, and slideably retained within the opposing slots in the bracket and configured to slideably rest atop the control rod when it is rotated to its first position, and for engagement with the latch block when the control rod is rotated to its second position, and for manual raising along the slot; and a latch tang pivotally mounted within the bracket and configured to slideably rest atop the control rod when it is rotated to its first position, and for engagement with the latch block when the control rod is rotated to its second position, and for manual raising by engagement with the latch bolt when it is manually raised within the slot.

15. The latch finger assembly of claim 14 which further comprises configuring the latch bolt to be accessible to for manual sliding from the outside of the bracket.

* * * * *